Aug. 18, 1936.   C. T. JACOBS   2,051,606
MOTOR VEHICLE CONTROL DEVICE
Filed Aug. 31, 1934   2 Sheets—Sheet 1
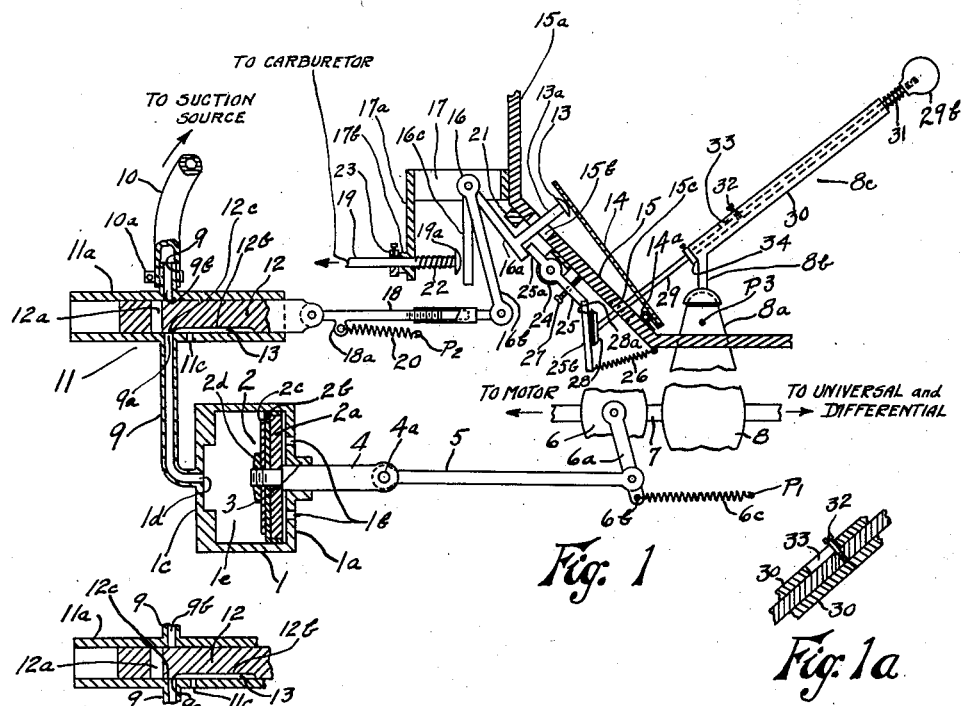
Fig. 1
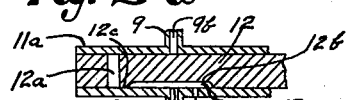
Fig. 1a
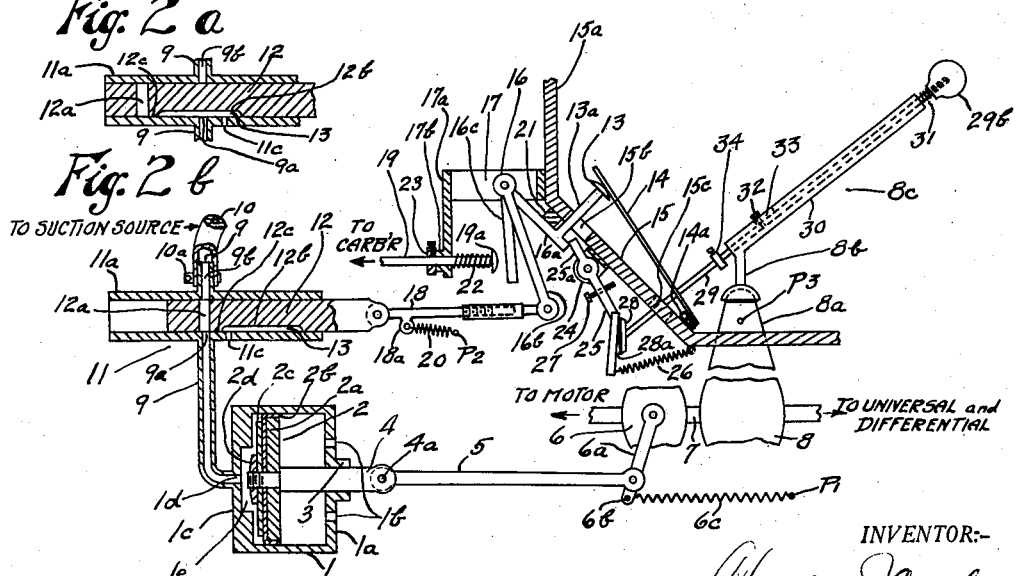
Fig. 2a
Fig. 2b
Fig. 2
INVENTOR:-
Charles T. Jacobs

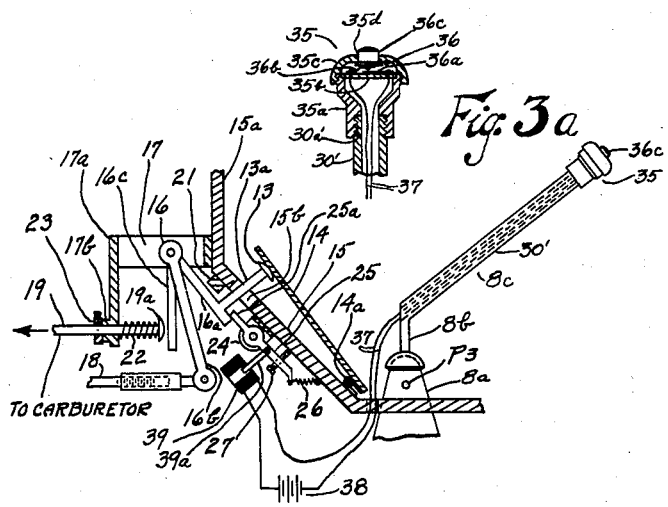

Patented Aug. 18, 1936

2,051,606

UNITED STATES PATENT OFFICE 2,051,606

MOTOR VEHICLE CONTROL DEVICE

Charles T. Jacobs, New Providence Township, Union County, N. J.

Application August 31, 1934, Serial No. 742,211

9 Claims. (Cl. 192—.01)

This invention relates to motor vehicles, and more particularly to operation control means and methods therefor.

It is a broad object of the invention to provide improved means and methods for controlling the operation of such vehicles.

The invention has particular reference to the device known in the art as the "automatic clutch". Such a device may for example be a piston or other movable member connected with a clutch which is interposed between the motor and the selective transmission of the vehicle, the piston or other member being pneumatically operated and disengaging the clutch in response to the performance of a certain "de-accelerating" action—normally the removal of foot pressure from the accelerator pedal of the vehicle. The de-accelerating action normally precedes and continues during readjustment of the selective transmission—i. e., the shifting of gears—and the resulting automatic clutch disengagement frees the transmission of connection with the motor and thus places and maintains it in condition for such readjustment. Conventionally, however, the piston or other member responds to all such de-accelerating operations, whether or not they are effected in connection with readjustment of the transmission; clutch disengagement is therefore effected at times when not required for transmission readjustment and when it is desirable for braking purposes that the motor remain connected with the transmission and therethrough with the driving wheels of the vehicle.

It is an object of my invention to provide an automatic clutch system responsive at times of readjustment of the transmission, but normally unresponsive at other times.

It is another object of my invention to provide an automatic clutch system responsive only to the joint establishment of a plurality of conditions naturally incident to readjustment of the transmission.

A further object of my invention is to provide such automatic clutch systems wherein re-engagement of the clutch, once the same is disengaged, will occur as a wholly automatic incident to re-acceleration.

It is still another object of my invention to provide means for preventing the response of the automatic clutch to simple de-acceleration, such means being rendered inoperative with the greatest facility as an incident to transmission readjustment.

Other and allied objects will more fully appear from the following description and the appended claims.

In the detailed description of my invention, hereinafter set forth, reference is had to the accompanying drawings, of which:—

Figure 1 is a generally cross-sectional view of portions of a vehicle equipped with my invention, taken vertically through and longitudinally of the vehicle;

Figure 1a is an enlarged cross-sectional view of a detail appearing in elevation in Figure 1;

Figure 2 is a view similar to Figure 1, but illustrating various portions in a different condition of adjustment from the condition shown in that figure;

Figure 2a is a fractional view similar to a portion of Figure 2 but illustrating a further readjustment of a therein included part;

Figure 2b is a view entirely similar to Figure 2a excepting for a still further readjustment of the mentioned part;

Figure 3 is a view generally similar to a portion of Figures 1 and 2, but illustrating a modification of my invention in respect to certain of the components; and Figure 3a is an enlarged, cross-sectional view of a small portion appearing in plan in Figure 3.

Figure 2, with its auxiliary Figures 2a and 2b, may first be referred to for the understanding of a typical automatic clutch system to which my invention may be applied. While these figures, together with the generally similar Figure 1, actually illustrate one embodiment of my invention, there will first be described only sufficient portions thereof to show conventional automatic clutch operation. It will be understood that these portions are shown to some extent schematically, and only in sufficient detail to illustrate the co-operation therewith of the various novel features of my invention, and that they may be subjected to wide alteration and elaboration without occasioning a departure from the spirit or scope of the invention.

In Figure 2 the numeral 1 designates a generally closed cylinder in which may slide longitudinally the piston 2, the rear end 1a of the cylinder being provided with the central boss 3 in which may slide the piston rod 4. For purposes of the instant invention it may be assumed that atmospheric pressure prevails within the cylinder to the rear of the piston 2, and accordingly air vents 1b are shown in the rear cylinder end 1a. The piston 2 itself may be of any suitable form, having been illustrated as comprising the main disc 2a, the leather facing 2b in contact with the forward face and periphery of the disc 2a, the clamping washer 2c, and the clamping nut 2d securing the assembly to the piston rod 4. Pivotally secured to the piston rod extremity 4a is the clutch rod 5, which operatively connects the piston rod extremity with the clutch crank 6a near the extremity 6b of the latter. The clutch crank 6a forms a part of the schematically shown clutch 6, from which the drive shaft or other means 7 passes forwardly to the motor (not shown) and rearwardly through the schematically shown transmission 8 to the "universal", differential, and driving wheels (not shown).

With the piston 2 and crank 6a in their rearward positions (as shown in Figure 1) the clutch 6 will be understood to be engaged; these parts are biased to such positions by any suitable means, a tension spring 6c having been illustrated between the crank extremity 6b and a more rearward fixed point $P_1$. For moving the piston 2 against the force of the biasing means 6c to a position forward within the cylinder 1 (as shown in Figure 2) and thus disengaging the clutch, suction is applied to the space within the cylinder 1 forward of the piston; this space may accordingly be termed the suction chamber, and is designated as 1e in Figure 2. Thus in the forward end 1c of the cylinder 1 is provided the aperture 1d connecting with the pipe 9, in which pipe is interposed the valve assembly 11 hereinafter detailedly described. A hose 10 is clamped as by clamp 10a to the top extremity of the pipe 9, and connects the same with a source of suction (not shown) which may for example be the intake manifold of the motor.

The function of the valve 11 is the control of the pressure conditions within the suction chamber 1e. The valve may illustratively comprise a cylindrical casing 11a and a generally cylindrical plunger 12 slidably fitting therewithin. The plunger 12 is provided with a transverse hole 12a of diameter similar to or slightly larger than that of the openings 9a and 9b of the pipe 9 into the bottom and top, respectively, of the casing 11a. Furthermore the plunger 12 is provided on its bottom with a flat surface portion 12b which forms a space 13 with the bottom of the casing 11a; this flat surface begins at a point rearward of the rear side of hole 12a and extends rearwardly from this point by an amount somewhat in excess of the intended range of movement of the plunger within the casing. Slightly to the rear of pipe 9, and in a position which for any position of the plunger within its normal range of movement is intermediate the extremities of the flat surface 12b, the bottom of the casing is provided with an outlet vent 11c.

The intended range of movement of the plunger 12 is illustrated in the group of figures comprising Figures 2, 2a and 2b. The most rearward position is shown in Figure 2, wherein the hole 12a is in substantial alignment with the pipe openings 9a and 9b. Obviously with the plunger in this position, or in any nearby one in which the pipe openings are even partially connected with the hole 12a and the opening 9a at the same time disconnected from the space 13, the suction chamber 1e is connected only with the source of suction (through the hole 12a) and a vacuum is created in the chamber. Such positions of the plunger are conveniently termed "evacuating" positions.

As the plunger 12 is moved forward it will quickly reach the position illustrated in Figure 2a. Herein the plunger portion 12c lying between the hole 12a and the flat surface 12b is beginning to uncover the pipe opening 9a to the space 13; by virtue of the vent 11c atmospheric pressure will be admitted to the suction chamber 1e through the space 13 and the pipe opening 9a, or in other words any vacuum which may then exist in the suction chamber will be discharged and the piston 2 will be permitted to respond to the force of the biasing means 6c. The plunger 12 may be moved still further forward to some such extreme position as illustrated in Figure 2b; at all positions in the range of movement between the positions of Figures 2a and 2b, however, the suction chamber 1e remains connected with the vent 11c and thus discharged of vacuum. Positions of the plunger in this range are conveniently termed "discharging" positions.

The position of the plunger 12 is made directly responsive to the accelerator pedal control of the vehicle, such a pedal proper being shown as 13 in Figure 2. Frequently it is considered desirable that the operator's foot be not pressed directly on the pedal, but on an appropriate foot-piece which transmits the foot pressure to the pedal proper. Accordingly such a foot-piece has been illustrated as 14, pivotally supported to the floor-board 15 as by the spring hinge 14a which very, very lightly biases it against the pedal 13. The pedal 13 forms the upper extremity of a pedal post 13a, which extends downwardly and forwardly through a hole 15b in the floor-board and has been illustrated as secured in a generally right angular relationship to the arm 16a. This arm extends downwardly and rearwardly from a hub 16 to which it is rigidly secured, and which in turn is supported for rotation, in an axis transverse of the vehicle, to a bracket 17 extending forwardly from the dash-board 15a. From this hub 16, or from other hubs coaxial and rotatively secure with respect thereto, may extend generally downwardly two other arms 16b and 16c hereinafter described.

The coupling of the plunger 12 to the accelerator pedal 13 is effected through the arm 16b and the turnbuckle coupling 18, the latter being pivotally secured at its rear and forward ends, respectively, to the extremity of arm 16b and to the rear extremity of plunger 12. An urge to rearward movement of the arms 16a, 16b and 16c (or a counter-clockwise rotating urge to the hub 16 as illustrated) is imparted in any convenient manner; thus there has been illustrated a tension spring 20 connected between a lug 18a on the coupling 18 and a more rearward fixed point $P_2$. Such arm movement (or counter-clockwise rotation of the hub 16) is limited in any convenient manner, as by the stop member 21 secured to the bottom of the floor-board 15 in position to be impinged against by the arm 16a. This stop member obviously establishes a limiting upper position for the accelerator pedal 13, which position the pedal is seen to occupy in Figure 2. The turnbuckle coupling 18 is so adjusted that with this position of the pedal the plunger occupies an evacuating position wherein hole 12a is vertical and in substantial alignment with the openings 9a and 9b.

The primary function of an accelerator pedal is, by a suitable connection with the carburetor, to regulate the extra inflow of fuel above a minimum established by other means not involved in the present invention. In the instant illustration such a connection is formed by the carburetor control rod 19 in association with the arm 16c. Thus the carburetor control rod 19 may pass rearwardly from the carburetor (not shown) through a boss 17b formed in an apron 17a depending from the bracket 17. Slightly rearward of the apron 17a the rod 19 may terminate in a head 19a, and it may be biased to rearward movement (corresponding to reduction of extra fuel inflow) by an expansion spring 22 surrounding the rod between this head 19a and the apron. Such rearward movement may be limited by the collar 23 adjustably secured about the rod forward of the boss 17b. The rod head 19a is positioned in the path of movement of the arm 16c, and is adapted to be moved forwardly by that arm, and thus to increase extra fuel inflow, when that arm moves sufficiently forward. More precisely, the collar 23 is so adjusted that when the accelerator pedal 13 is fully raised (as in Figure 2) a space exists between arm 16c and rod head 19a, and that the arm 16c will just have been brought into contact with the rod head 19a when the pedal 13 has been depressed approximately sufficiently to bring the plunger 12 into its most rearward discharging position (that shown in Figure 2a). Of course after this adjustment of collar 23 the relationship of rod 19 to the carburetor may be arranged so that extra inflow of fuel is just cut off when rod 19 has moved to the most rearward position permitted by the collar.

The conventional functioning of the apparatus as thus far described may be outlined as follows: Whenever the accelerator pedal 13 and foot-piece 14 are freed of downward foot pressure, the pedal assumes its limiting upward position (Figure 2) in response to the force of spring 20, and the plunger 12 assumes an evacuating position. The piston 2 is thereupon moved forwardly by the evacuation of the chamber 1e and the clutch 6 thus disengaged, the forward position of the piston and the disengagement of the clutch being positively maintained by suction so long as the accelerator pedal continues in this position. During this time the arm 16c is out of contact with the rod head 19a and the carburetor control rod 19 in response to spring 22 occupies its most rearward position, providing no extra fuel inflow. As the accelerator pedal is depressed, by foot pressure thereon or on the foot-piece 14, the plunger 12 will be moved forwardly; at some early moment in this pedal depression the plunger will reach its most rearward discharging position (Figure 2a) and the arm 16c will substantially coincidentally reach the rod head 19a. Up to this moment the clutch will have remained disengaged since no opportunity will have been afforded for discharge of vacuum from the chamber 1e; furthermore the rod 19 will not have been moved and consequently no extra fuel inflow will have taken place. Now, however, the vacuum will be discharged and the clutch permitted to engage in response to the biasing means 6c; simultaneously the forward movement of the arm 16c will initiate a forward movement of the rod 19 and an extra fuel inflow. Assuming the transmission 8 to have been adjusted to some finite ratio, the coincident clutch engagement and initiation of extra fuel inflow will be appropriate to initiation of vehicle movement or increase in the speed thereof, as the case may be. Thereafter the accelerator pedal 13 may be manipulated at will to control the extra fuel inflow, without producing disengagement of the clutch, but only so long as the operator limits the rise of the pedal to less than required to bring plunger 12 into an evacuating position. When the operator permits the pedal rise to exceed this limit, the chamber evacuating and clutch disengaging operation outlined at the beginning of this paragraph will be re-initiated. As so described the clutch will be seen to be responsive, as to both disengagement and engagement, solely to the accelerator pedal.

According to my invention the clutch preferably remains responsive, as to engagement, solely to the accelerator pedal; but as to disengagement it is made responsive—cumulatively and distinguished from alternatively—to both the accelerator pedal and the transmission control (e. g., the gear-shift lever). The clutch is responsive to these two controls cumulatively in that it disengages only when particular conditions of the two respective controls have been jointly established. These conditions are ones which the operator either intuitively or with negligible attention establishes simultaneously at a time of intended transmission readjustment, but which will not at other times be jointly established excepting as a result of a very deliberate intent. The effect of the novel arrangement is to obviate clutch disengagement upon mere de-acceleration, but to cause clutch disengagement when de-acceleration is accompanied by a simple manipulation of the transmission control which is practically inherently performed in the operation of readjusting the transmission. A general form which my invention may take is represented by the apparatus portions already described, together with means which normally suppress the application of suction to the chamber 1e but which are released or rendered inoperative as an incident to manipulation of the transmission control.

I have illustrated two species of my invention, in each of which I provide means normally operative to limit the range of adjustment of the valve 11 (i. e., the range of movement of the plunger 12), and releasing means therefor forming a portion of or being associated with the transmission control. The two species differ from each other largely in the form of the manipulating means abovementioned. Figures 1, 1a, 2, 2a and 2b illustrate the first species; the description of Figures 2, 2a and 2b has already been partially made and will now be completed. It should be understood that Figure 1 may be referred to as well as Figure 2, the two figures being identical excepting for the condition of adjustment of certain of the parts.

There may first be noted a detail of construction of the plunger 12 illustrated but not above specifically mentioned. This detail is that the distance from the rear edge of the hole 12a to the forward extremity of the flat portion 12b—i. e. the length of the portion 12c—is made somewhat greater than the diameter of the pipe opening 9a. Thus there exists, and is illustrated in Figure 1, a position of the plunger intermediate its evacuating position (Figure 2) and its most rearward discharging position (Figure 2a) wherein the pipe opening 9a, and thus the suction chamber 1e, will be completely closed by the portion 12c. Any pressure condition which may obtain within the suction chamber at the moment of establishment of this position of the plunger will obviously be maintained so long as the plunger position is maintained (neglecting any slow, second order leakage effects). This position of the plunger may therefore be termed its "maintaining" position.

In Figures 1 and 2 I show means normally operative to limit rearward movement of the plunger to this maintaining position. This means I have illustrated as a lever 25, pivoted to a bracket 24 secured underneath the floor-board 15 slightly to the rear of the hole 15b. Through the rear portion of the lever 25 may be passed an adjustable screw 27, which by impingement against the floor-board 15 may serve to establish a limiting position for upward movement of this rear portion (i. e., for counter-clockwise rotation of the lever as illustrated). The lever is biased to this limiting position by any suitable means, such as the tension spring 26 terminally secured to the floor-board 15 and to some point on the rear portion of the lever assembly. The path of movement of the forward portion 25a of the lever is arranged to extend into the path of movement of the extremity of arm 16a, and the screw 27 is adjusted so that when the lever occupies the limiting position to which it is biased it will have moved the arm 16a forwardly by an amount just sufficient to bring the plunger 12 into its maintaining position abovementioned. The springs 26 and 20 are so tensioned relative to each other that in the region of overlap of the lever portion 25a and the arm 16a the force of spring 26 will definitely predominate, preventing the plunger from reaching an evacuating position. The condition illustrated in Figure 1 is thus maintained as a normal one, the accelerator pedal 13 occupying as a normal position one slightly lower than it would occupy in the absence of the lever 25. Obviously foot pressure may be freely applied to and withdrawn from the pedal 13 or the foot-piece 14 without ever causing occupation of an evacuating position by the plunger 12 and hence without causing disengagement of the clutch 6.

From the transmission 8 there may extend upwardly through the floor-board 15 the truncated conical casing 8a, and outwardly through the top of this casing may pass the adjusting rod 8b. This rod will be understood to be in effect pivoted for both slight sideward and slight front-and-back movement at some point $P_3$ within the casing 8a, the function of moving the rod about this pivoting point being the adjustment of the transmission ratio. Extending upwardly and rearwardly from the rod 8b wherewith to move the rod is the transmission control means—e. g., the gear-shift lever—which in its entirety is designated as 8c. In this transmission control means I include means for releasing the limiting means comprised by lever 25 and therewith associated apparatus just described.

The main portion of this transmission control means 8c may be a thin cylinder 30 secured at its lower and forward extremity to the rod 8b and having its upper extremity very nearly in a suitable position for convenient grasp by the operator. Slidably fitting within this cylinder 30 is a rod 29, which may be splined within the cylinder by the screw 32 threaded into the rod and operating in a limited longitudinal slot 33 in the cylinder. The rod 29 may extend outwardly from the rear, upper extremity of the cylinder 30 to terminate at a slight distance therefrom in a knob 29b suitable and conveniently positioned for grasp by the operator. Between the knob and the cylinder 30 there may encircle the rod 29 a light expansion spring 31 of sufficient force to bias the rod 29 to upward movement within the cylinder. This movement may be limited by a collar 34 adjustably secured about the rod 29 at the opposite end of the cylinder 30. The rod 29 may extend from the latter end of the cylinder through an enlarged hole 15c in the floor-board, and may terminate in a cam member 28. The forward surface 28a of this member is spherical, and has as its effective center the point $P_3$ abovementioned.

From the rear portion of the lever 25 there may be formed the apron 25b extending very generally vertically, and transversely of the vehicle, to be intercepted by the axis of rod 29. The collar 34 may be secured to the rod 29 in such a position that in the absence of downward pressure on that rod, and with the lever 25 in its limiting counter-clockwise position (Figure 1), the cam surface 28a substantially contacts with the rear surface of the apron 25b. If now the rod 29b be slightly depressed the cam surface 28a will be moved forwardly and will in turn move forwardly the apron 25b. This rotates the lever 25 clockwise, thus removing the limitation normally imposed by the lever upon rearward movement of the arm 16a, plunger 12, etc.

A few details may be noted. As to the cam 28, rotation of the rod 29 about its own axis, which would shift the effective center of the spherical surface, is prevented by the splining of rod 29 to cylinder 30 abovementioned. This splining has been illustrated in enlarged scale in the detail cross-sectional Figure 1a. Further as to the cam, although the rod 8b is subjected in adjustment of the transmission to slight rotation about its effective pivot point $P_3$ both sideward and front-and-back, the formation of the surface 28a about point $P_3$ as an effective center precludes this rotation of rod 8b from moving the apron 25b. Of course the effective center of the surface 28a is slightly shifted when the rod 29 is subjected to slight downward axial movement; because of the smallness of the contemplated such movement compared to the radius of the surface 28a, however, this effect is negligible, and the surface 28a remains substantially what it may be more nearly rigorously when the rod 29 is not moved downwardly—i. e., a spherical surface about $P_3$ as an effective center. As to the various springs 20, 26 and 31, it has already been noted that at their region of mutual influence the force of spring 26 is to preponderate over that of spring 20. The degree of this preponderance may be made small, however, and it will be seen that in this event only a small forward force will be required on the apron 25b for movement thereof sufficient to permit arm 16a to impinge against stop member 21— this being all the apron movement required for complete release of the limiting action of lever 25. The spring 31 need have only sufficient force to overcome the force of gravity on the assembly of rod 29 and the effects of friction on the rod movement. The net combined resistance of the several springs to downward movement of the knob 29b (i. e., axial movement of rod 29) may thus be made very small.

The general principles of operation of this species of my invention have appeared as the description has been developed above. In use, so long as the operator does not press downwardly on the knob 29b he may indulge in free manipulation of the accelerator pedal without ever by this manipulation alone causing clutch disengagement. This results from the limitation of rearward movement of the plunger 12 to the maintaining position, so that it cannot connect the pipe opening 9a to the opening 9b. When the operator desires to readjust the transmission, however, he need only perform the usual operation of relieving the accelerator pedal of foot pressure and place his hand on the knob 29b, applying a light downward pressure thereon. This permits the plunger to move into an evacuating position in response to the spring 20 and the piston 2 then immediately begins and almost instantly completes the operation of disengaging the clutch. Thus without removing his hand from the knob 29b, and substantially as an integral operation with that of applying the downward pressure abovementioned, the operator may apply the particular sideward and/or front or back pressure to the knob 29b which may be required for the movement of rod 8b appropriate to the particular transmission readjustment which may be desired.

The downward pressure on knob 29b need be continued only for the minute time interval required to produce clutch disengagement, since the clutch does not re-engage upon mere release of this pressure. Such re-engagement occurs, as conventionally, when the accelerator pedal is moved downwardly sufficiently to move plunger 12 into a discharging position. This results from the fact that although the downward knob pressure be released, until the accelerator pedal is depressed the plunger 12 moves forwardly only to its maintaining position; herein the vacuum in the suction chamber 1e, although no longer positively maintained by continued application of suction, is nevertheless prevented by plunger portion 12c from discharging. Small, second-order leakage may of course occur, about the portion 12c or about the piston 2, and would eventually discharge the vacuum and occasion clutch engagement. With reasonable construction of the parts, however, the length of time required by such leakage to produce clutch engagement is many, many times the interval required for transmission readjustment.

When the accelerator pedal is relieved of downward pressure the operator, if he deliberately desires clutch disengagement for purposes other than transmission readjustment (coasting or the like), may apply a downward pressure of almost momentary duration to the knob 29b without otherwise manipulating it. Thereupon the clutch will of course disengage, and will remain disengaged pending re-acceleration or discharge of vacuum by slow leakage. It is to be noted that the accidental production of such a momentary or other downward pressure on the knob 29b will not produce clutch disengagement if at the time of its occurrence the accelerator pedal is depressed. This is an advantageous feature, in that it precludes accidental clutch disengagement at practically all times when any substantial power is being transmitted through the clutch.

In the species illustrated in Figures 3 and 3a I have substituted electromagnetic lever releasing means for the mechanical releasing means shown in preceding figures. For the thin cylinder 30, secured to the rod 8b and forming a portion of the transmission control means, I have substituted another preferably thin cylinder 30', which may be threaded at its upper extremity 30a' as shown in the detail cross-sectional Figure 3a. Onto this threaded extremity may be screwed the generally cylindrical knob base 35a, which at its outer extremity is externally threaded and provided with the transverse insulating disc 35b. The knob 35 is completed by the knob cap 35c screwed onto the knob base 35a. To the outer face of the disc 35b is secured a contact member 36a and a spring member 36b; the spring member is arranged for movement into contact with the contact member, but is inherently biased out of such contact and against the head of a generally T-section button 36c which loosely fits within a hole 35d in the end of cap 35c and extends slightly therefrom. Slight pressure on the outer end of button 36c forces the spring member 36b into contact with the contact member 35a; thus these three members form a normally open electrical switch which may be designated as 36. This switch, by leads 37 passing internally of the cylinder 30', is connected in series with the schematically shown battery 38 and a solenoid 39. This solenoid is rigidly mounted underneath and forward of the rear portion of lever 25, and is provided with a plunger 39a extending axially thereof and outwardly therefrom to be pivotally connected to the rear portion of the lever 25.

Obviously downward pressure on the button 36c (i. e., pressure axial of the cylinder 30') will close the switch 36 and cause energization of solenoid 39 by battery 38, moving the plunger 39a forwardly and downwardly. This rotates the lever 25 counter-clockwise (as shown) against the force of its bias, and thus performs the same releasing function as pressure on the knob 29b in the embodiment of earlier figures. In use this species, like the other, requires slight movement by the operator of one portion of the transmission control means relative to the balance; this movement, however, is of a portion of the knob assembly relative to the balance, rather than of the entire knob assembly relative to its supporting cylinder 30 as in the preceding species.

In the broader claims hereunto appended I intend to claim my invention in broad terms, subject only to such limitations as the state of the art may impose. Certain other claims are also appended, directed each to one or the other of the two illustrated species of my invention respectively illustrated in Figures 1–1a–2–2a–2b and Figures 3–3a.

Finally it may be noted that while the invention has been conveniently illustrated and described in connection with the conventional suction-operated automatic clutch system, it is obviously likewise applicable to automatic clutch systems operated by other forces than suction.

I claim:

1. In combination in a motor vehicle having a clutch, a clutch operating device, and a transmission: movable means for controlling said device; transmission control means; and means connected with said transmission control means for altering the range of movement of said device control means.

2. In combination in a motor vehicle having a clutch, a clutch operating device, and a transmission: movable motor control means; movable means, connected with said motor control means for movement therewith, for controlling said device; transmission control means; and means, connected with said transmission control means for manipulation therewith, for altering the range of movement of said device control means.

3. In combination in a motor vehicle having a clutch and a clutch operating device: movable motor control means; means for controlling said device, movable to clutch disengaging and other positions and connected with said motor control means for movement therewith; bias means normally restricting the movement of said device control means to said other positions only; and means operable at will to release said restricting means.

4. In combination in a motor vehicle having a clutch, a clutch operating device, and a transmission: movable motor control means; means for controlling said device, movable to clutch disengaging and other positions and connected with said motor control means for movement therewith; means normally restricting the movement of said device control means to said other position only; and means connected with said transmission control means for releasing said restricting means.

5. In combination in a motor vehicle having a clutch, a clutch operating device, and a transmission: movable means for controlling said device; a member biased normally to limit the movement of said device control means; transmission control means; and means, at least partially carried by said transmission control means and extending therefrom to said member, for moving said member to remove said movement limitation.

6. In a motor vehicle, a gear shift lever having a substantially vertical lower portion effectively pivoted about a point and arranged for small pivotal movements; an inclined rod slidably supported to said lever above said point, having a lower extremity forward of said point, and arranged for small longitudinal movement; and a cam member carried by said rod at said lower extremity, the surface of said member being substantially spherical about said point.

7. In combination in a motor vehicle having a clutch, a clutch operating device, and a transmission: movable motor control means; transmission control means; an adjustable valve, for controlling said device, connected with said motor control means; means normally operative to limit the range of adjustment of said valve; and means, forming a portion of said transmission control means and operable incidentally to transmission readjustment, for rendering said limiting means inoperative.

8. In combination in a motor vehicle having a clutch, a clutch operating device, and a transmission: movable motor control means; transmission control means; an adjustable valve, for controlling said device, connected with said motor control means; a member biased normally to limit the range of adjustment of said valve; a rod, slidably arranged in said transmission control means and extending therefrom to said member; and a knob carried by said rod and arranged upon axial movement of said rod to move said member, and upon movement transverse thereto to readjust said transmission.

9. In combination in a motor vehicle having a clutch, a clutch operating device, and a transmission: movable motor control means; transmission control means; an adjustable valve, for controlling said device, connected with said motor control means; a member biased normally to limit the range of adjustment of said valve; electromagnetic means for moving said member whereby to remove said range limitation; and a switch, forming a portion of said transmission control means and manipulable incidentally to transmission readjustment, for controlling said electromagnetic means.

CHARLES T. JACOBS.